(12) United States Patent
Radue et al.

(10) Patent No.: US 10,815,908 B2
(45) Date of Patent: Oct. 27, 2020

(54) THROTTLE DRIVE ACTUATOR FOR AN ENGINE

(71) Applicant: Kohler Co., Kohler, WI (US)

(72) Inventors: Martin L. Radue, Plymouth, WI (US); William D. Koenigs, Fond du Lac, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/650,700

(22) Filed: Jul. 14, 2017

(65) Prior Publication Data

US 2017/0328286 A1    Nov. 16, 2017

Related U.S. Application Data

(63) Continuation-in-part of application No. 14/876,166, filed on Oct. 6, 2015, now Pat. No. 9,739,218.

(51) Int. Cl.

| F02M 37/00 | (2006.01) |
|---|---|
| F02D 9/10 | (2006.01) |
| F02D 9/02 | (2006.01) |
| F02D 41/00 | (2006.01) |
| H02K 41/035 | (2006.01) |
| F02D 11/10 | (2006.01) |
| F02M 35/10 | (2006.01) |

(52) U.S. Cl.
CPC ............ *F02D 9/1065* (2013.01); *F02D 9/02* (2013.01); *F02D 11/10* (2013.01); *F02D 41/0002* (2013.01); *F02M 35/10249* (2013.01); *F02M 35/10255* (2013.01); *H02K 41/0358* (2013.01); *F02D 2011/102* (2013.01); *Y02T 10/42* (2013.01)

(58) Field of Classification Search
CPC .... F02D 9/1065; F02D 11/10; F02D 41/0002; F02D 2011/102; F02M 35/10249; F02M 35/10255; H02K 41/0358; Y02T 10/42
USPC .......................................................... 123/434
See application file for complete search history.

(56) References Cited

U.S. PATENT DOCUMENTS

| 914,094 A | 3/1909 | Whalen et al. |
|---|---|---|
| 3,459,976 A * | 8/1969 | Nyman ...................... B41J 9/38 |
| | | 101/93.29 |
| 3,593,238 A | 7/1971 | Mori |
| 3,628,073 A | 12/1971 | Berney |
| 4,181,288 A | 1/1980 | Bylsma |
| 4,345,228 A | 8/1982 | Idogaki et al. |
| 4,392,375 A | 7/1983 | Eguchi et al. |
| 4,409,940 A | 10/1983 | Gaus |
| 4,519,360 A | 5/1985 | Murakami |

(Continued)

FOREIGN PATENT DOCUMENTS

EP    0 154 036 A2    9/1985

OTHER PUBLICATIONS

European Search Report for EP 16 18 9895 dated Feb. 10, 2017, 9 pages.

(Continued)

*Primary Examiner* — Hung Q Nguyen
*Assistant Examiner* — Anthony Donald Taylor, Jr.
(74) *Attorney, Agent, or Firm* — Klintworth & Rozenblat IP LLP

(57) ABSTRACT

A throttle drive actuator for an engine includes a rotor and a stator. The rotor connects with a valve of a throttle body to rotate the valve, to open a close an air passage of the throttle body of the engine.

13 Claims, 7 Drawing Sheets

(56) References Cited

U.S. PATENT DOCUMENTS

| | | | |
|---|---|---|---|
| 4,546,338 A | 10/1985 | Idogaki et al. | |
| 4,601,271 A * | 7/1986 | Ejiri | F02D 11/10 |
| | | | 123/361 |
| 4,639,624 A | 1/1987 | Ejiri | |
| 4,651,041 A * | 3/1987 | Shiraki | F02D 11/10 |
| | | | 251/129.02 |
| 4,698,535 A | 10/1987 | Shiraki et al. | |
| 4,735,183 A | 4/1988 | Inoue et al. | |
| 4,850,322 A * | 7/1989 | Uthoff | F02D 11/10 |
| | | | 123/399 |
| 4,944,269 A * | 7/1990 | Imoehl | B60K 26/021 |
| | | | 123/399 |
| 5,080,065 A | 1/1992 | Nomura et al. | |
| 5,168,184 A * | 12/1992 | Umehara | H02K 41/0358 |
| | | | 310/13 |
| RE34,302 E * | 7/1993 | Imoehl | B60K 26/021 |
| | | | 123/399 |
| 5,287,835 A * | 2/1994 | Fiorenza, II | F02D 9/02 |
| | | | 123/352 |
| 5,606,950 A * | 3/1997 | Fujiwara | F02D 11/10 |
| | | | 123/399 |
| 5,619,112 A | 4/1997 | Younessi et al. | |
| 5,738,072 A * | 4/1998 | Bolte | F02D 11/106 |
| | | | 123/399 |
| 5,823,165 A * | 10/1998 | Sato | F02D 11/10 |
| | | | 123/399 |
| 5,996,554 A * | 12/1999 | Tojo | H02K 26/00 |
| | | | 123/399 |
| 5,998,892 A * | 12/1999 | Smith | G01B 7/30 |
| | | | 251/129.01 |
| 6,020,804 A | 2/2000 | Gandel | |
| 6,067,961 A | 5/2000 | Kato | |
| 6,109,589 A | 8/2000 | Ackermann | |
| 6,116,215 A | 9/2000 | Soleanicov et al. | |
| 6,215,207 B1 * | 4/2001 | Kondo | H02K 26/00 |
| | | | 310/156.28 |
| 6,247,447 B1 | 6/2001 | Muraji | |
| 6,299,129 B1 | 10/2001 | Suzuki et al. | |
| 6,320,285 B1 | 11/2001 | Ito et al. | |
| 6,332,451 B1 * | 12/2001 | Sato | F16K 1/221 |
| | | | 123/399 |
| 6,516,776 B1 | 2/2003 | Kai et al. | |
| 6,541,881 B1 | 4/2003 | Turner | |
| 6,729,299 B2 * | 5/2004 | Anschicks | F02D 9/1065 |
| | | | 123/361 |
| 6,874,468 B2 | 4/2005 | Watanabe | |
| 7,028,979 B2 | 4/2006 | Fauni | |
| 7,100,568 B2 * | 9/2006 | Bornmann | F02D 11/10 |
| | | | 123/337 |
| 7,104,254 B2 * | 9/2006 | Arai | F02D 9/104 |
| | | | 123/376 |
| 7,137,614 B2 | 11/2006 | Masui et al. | |
| 7,284,535 B2 | 10/2007 | Irihune et al. | |
| 7,458,360 B2 | 12/2008 | Irihune et al. | |
| 7,591,245 B2 * | 9/2009 | Baasch | F02D 11/106 |
| | | | 123/399 |
| 7,946,555 B2 | 5/2011 | Ikeda | |
| 7,950,623 B2 | 5/2011 | Sasaki et al. | |
| 7,958,865 B2 * | 6/2011 | Ichikawa | F02D 9/105 |
| | | | 123/337 |
| 8,257,226 B2 * | 9/2012 | Reynolds | F02D 9/1065 |
| | | | 123/339.25 |
| 8,763,985 B2 | 7/2014 | Miki et al. | |
| 2004/0025949 A1 | 2/2004 | Wygnaski | |
| 2004/0154589 A1 * | 8/2004 | Wayama | F02D 9/105 |
| | | | 123/399 |
| 2006/0016427 A1 * | 1/2006 | Uda | F02D 9/1095 |
| | | | 123/399 |
| 2006/0038456 A1 * | 2/2006 | Bojiuc | H02K 23/04 |
| | | | 310/156.32 |
| 2007/0157902 A1 * | 7/2007 | Possehl | B62K 23/04 |
| | | | 123/400 |
| 2008/0224553 A1 * | 9/2008 | Abe | H02K 5/15 |
| | | | 310/71 |
| 2011/0140554 A1 * | 6/2011 | Wong | H02K 1/17 |
| | | | 310/72 |
| 2013/0255432 A1 * | 10/2013 | Nomura | B62K 23/04 |
| | | | 74/504 |

OTHER PUBLICATIONS

European Office Action for European Patent Application No. EP 16 189 895.2-1007 dated Mar. 27, 2018, 4 pages.

Chinese Office Action for Chinese Patent Application No. 201610859921.2 dated Jul. 26, 2019, 6 pages.

English summary of Chinese Office Action for Chinese Patent Application No. 201610859921.2 dated Jul. 26, 2019, 1 page.

* cited by examiner

THROTTLE DRIVE ACTUATOR FOR AN ENGINE

CROSS-REFERENCE TO RELATED APPLICATIONS

The present application is a continuation-in-part of U.S. patent application Ser. No. 14/876,166, filed Aug. 6, 2015, which is incorporated herein by reference in its entirety.

FIELD

The systems and methods relate to engines, and more particularly to a throttle drive actuator for a throttle body.

BACKGROUND

A motor can be used to control the tilt of a throttle valve for use in internal combustion engines. The motor can make adjustments of the throttle valve in response to the operation of the accelerator and varying operating conditions of the engine.

SUMMARY

According to one aspect, a throttle drive actuator for an engine includes a rotor and a stator. The rotor includes a north pole and a south pole. The rotor connects with a valve of a throttle body. The stator is positioned adjacent the rotor, and is configured to provide a magnetic field to rotate the rotor to open a close an air passage of the throttle body of the engine.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element.

DETAILED DESCRIPTION

Figure 1:
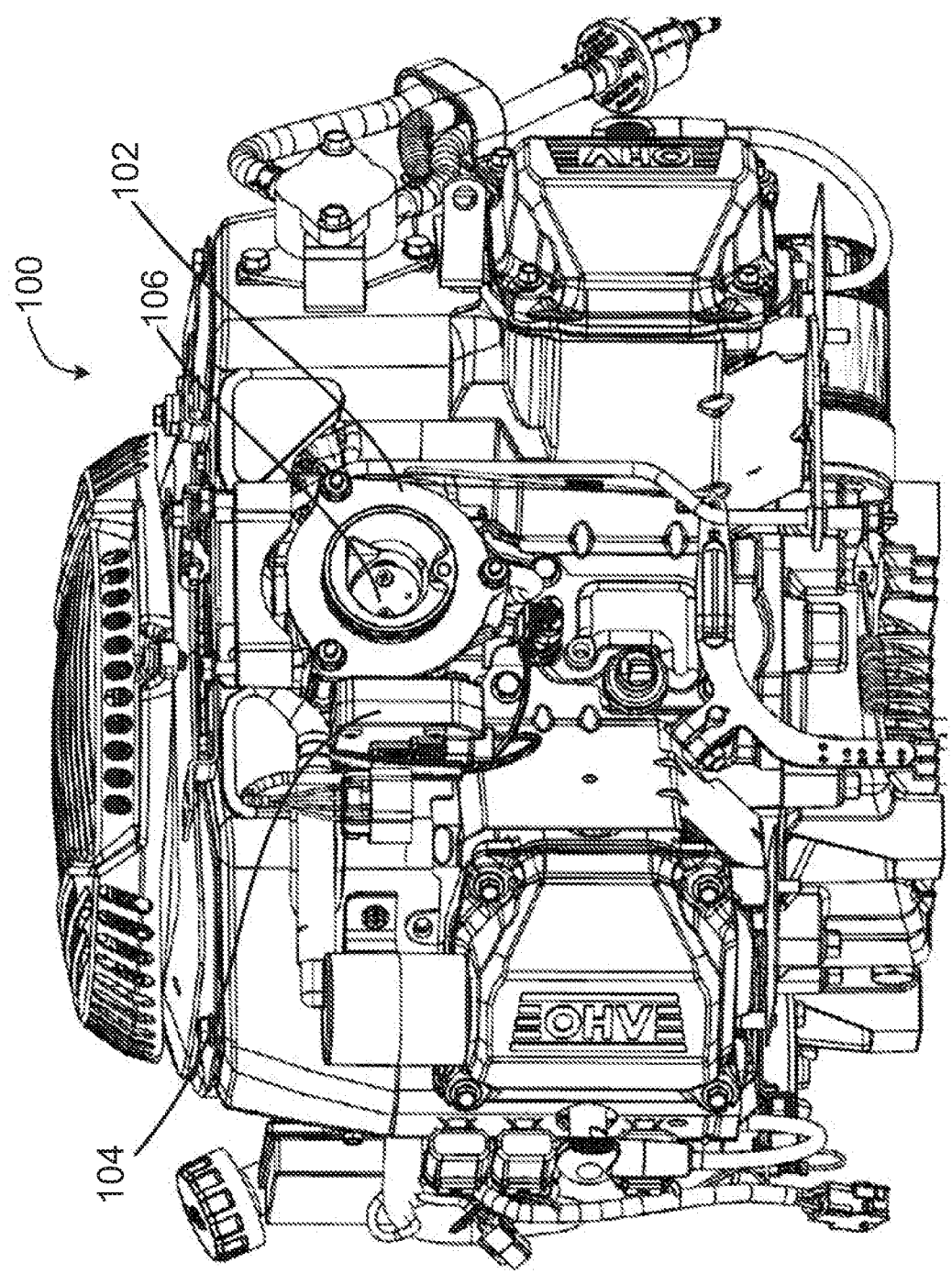
FIG. 1 is a schematic of an example engine including a throttle body.

While the disclosure may be susceptible to embodiments in different forms, there is illustrated in the drawings, and herein described in detail, one or more embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawings may be eliminated and/or substituted with alternative elements within the scope of the disclosure.

FIG. 1 is a schematic of an example engine 100 including a throttle body 102 to control the amount of air into the engine 100. The engine 100 can be used in various implementations, including but not limited to mowers, utility equipment, recreational equipment, generators, welders, etc. A throttle drive actuator 104 is connected with the throttle body 102 to rotate a valve 106 of the throttle body 102. The valve 106 opens and closes to allow more or less air through the throttle body 102, e.g., in response to the operation of an accelerator and varying operating conditions of the engine 100.

The throttle drive actuator 104 can control the tilt of the valve 106. As described in more detail below, the throttle drive actuator 104 includes a field magnet having at least one pair of N and S poles and an armature having at least one set of coils disposed in face-to-face confronting relation to the magnet. The throttle drive actuator 104 can be coupled directly to a shaft carrying the throttle valve 106, the actuator 104 being urged by a spring toward a position where the valve 106 throttles off the passage of air. The coils of the throttle drive actuator 104 are positioned relative to the N and S poles of the magnet such that when the coil is excited any conductor portions can act effectively to develop torque to rotate the valve 106.

Figure 2:
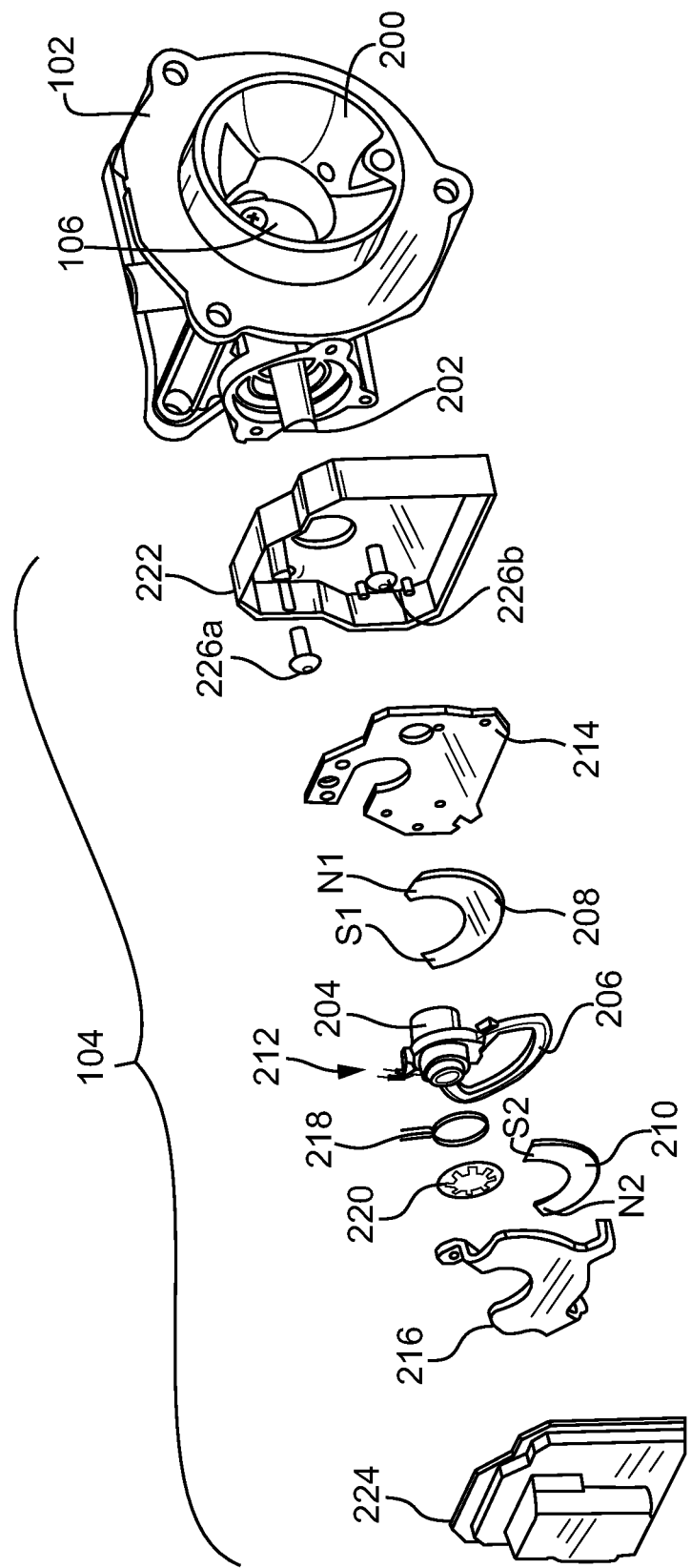
FIG. 2 is an exploded view of the example drive actuator that connects with the throttle body.

FIG. 2 is an exploded view of the example throttle drive actuator 104 that connects with the throttle body 102. The throttle body 102 has a cylindrical air passage 200 formed there through. In the air passage 200 the throttle valve 106 is supported by a rotary shaft 202. The throttle valve 106 can form a circular disk which closes the passage 200 or throttles the air flowing there through. Other shapes can be used. The rotary shaft 202 extends perpendicular to the central axis of the air passage and connect with the throttle drive actuator 104. The throttle valve 106 supported by the shaft 202 is placed under the influence of the drive actuator 104 which acts on the shaft 202 in such a way that the throttle valve 106 may be tilted to open and close the air passage 200. In operation, the throttle valve 106 is driven to rotate by the drive actuator 104 which is described in detail below, by way of the shaft 202, in such a way as to adjust the tilt of the valve for adjusting the opening of the air passage 200, hence the flow of air passing there through.

The rotary shaft 202 is secured to the throttle valve 106 at its diametral bisector line of the circular disk of the valve so that the shaft 202 is rotated integrally with the valve 106. The shaft 202 is attached at its opposite end to a coupler 204 of the rotary armature 206, or any suitable bearing means, in the throttle body 104. An armature 206 is positioned between opposing stationary magnet 208 having N1 and S1 poles and stationary magnet 210 having N2 and S2 poles in the opposite direction of magnet 208. For example, to create a magnetic field there between, pole N1 of magnet 208 opposes pole S2 of magnet 210, and pole S1 of magnet 208 opposes pole N2 of magnet 210, as described in more detail below. The magnet 208 may be mounted on a plate 214 and the magnet 210 may be mounted on a plate 216. In other implementations, the armature 206 may be stationary and the magnets 208 and/or 210 moved.

The coil of the armature 206 includes current carrying windings fed by wires 212 to induce a magnetic force which interacts with the magnet field created by magnets 208 and 210 to move the armature 206 which in turn rotates the shaft 202 to move the throttle valve 106 between open and closed positions. In other implementations, the armature 206 can include one or more magnets. The armature 206, the magnet 208, the magnet 210, etc. can all be enclosed in first housing portion 222 and an opposing second housing portion 224 to form a housing for the drive actuator 104. The first housing portion 222 can be removably attached to the throttle body 102 using fasteners 226a, 226b, e.g., screws or other fasteners. In this way the drive actuator 104 can be part of the original assembly with the throttle body 102, retrofitted to an existing throttle body 102 and/or replace a damaged drive actuator, etc.

Figure 3:
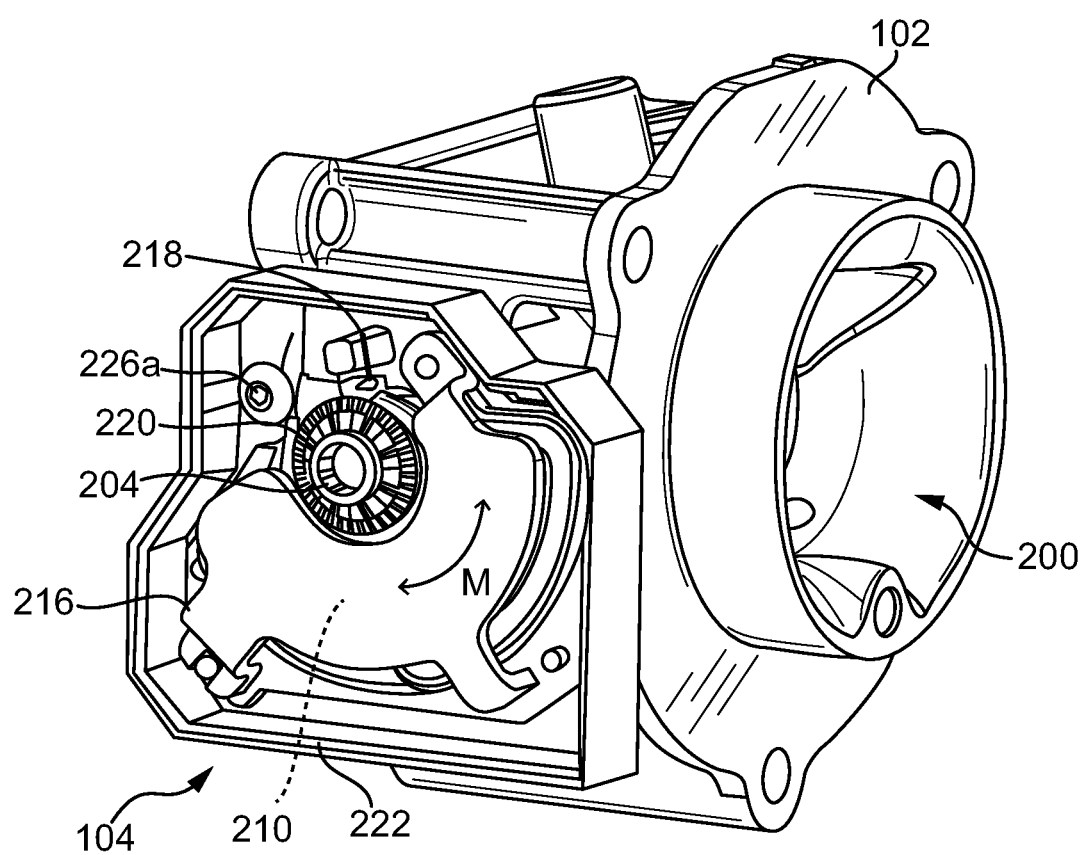
FIG. 3 is a schematic of the drive actuator of FIG. 2 assembled with the throttle body.

FIG. 3 is a schematic of the throttle drive actuator 104 assembled with the throttle body 102. When assembled the drive actuator 104 includes a thin profile, e.g., less than about a third of the width of the throttle body 102, while providing a force sufficient to move the valve 106. For example, with a 1 mS pulse, a peak force of about 13.4 in-lbs can be achieved in less than about 0.7 mS. In some implementations, the drive actuator 104 can rotate the shaft 202 through about at least 75 to 80 degrees of motion in the M directions. The magnets 208 and 210 can be generally arc shaped and sized to provide the 75 to 80 degrees of motion. Other shapes of the magnets and degrees of range of motion can be used, e.g., up to about 180 degrees of motion.

The magnets 208 and 210 can be constructed of one or more pieces. For example, the magnet 208 and/or the magnet 210 can be constructed of two magnets such that the south poles S1 and S2 and the north poles N1 and N2 are separate magnetic pieces. In other implementations the armature 206 may be implemented with one or more magnets instead of windings around a core. A return spring 218 biases the armature 206 in a de-energized position. A spring retaining clip 220 or other fastener holds the spring 218 so that the spring 218 can provide force to maintain the armature 206 in the determined position, e.g., to keep the valve 106 closed when no current is applied to the armature 206. Alternatively, in other implementations the spring 218 can keep the valve 106 open when de-energized.

Figure 4:
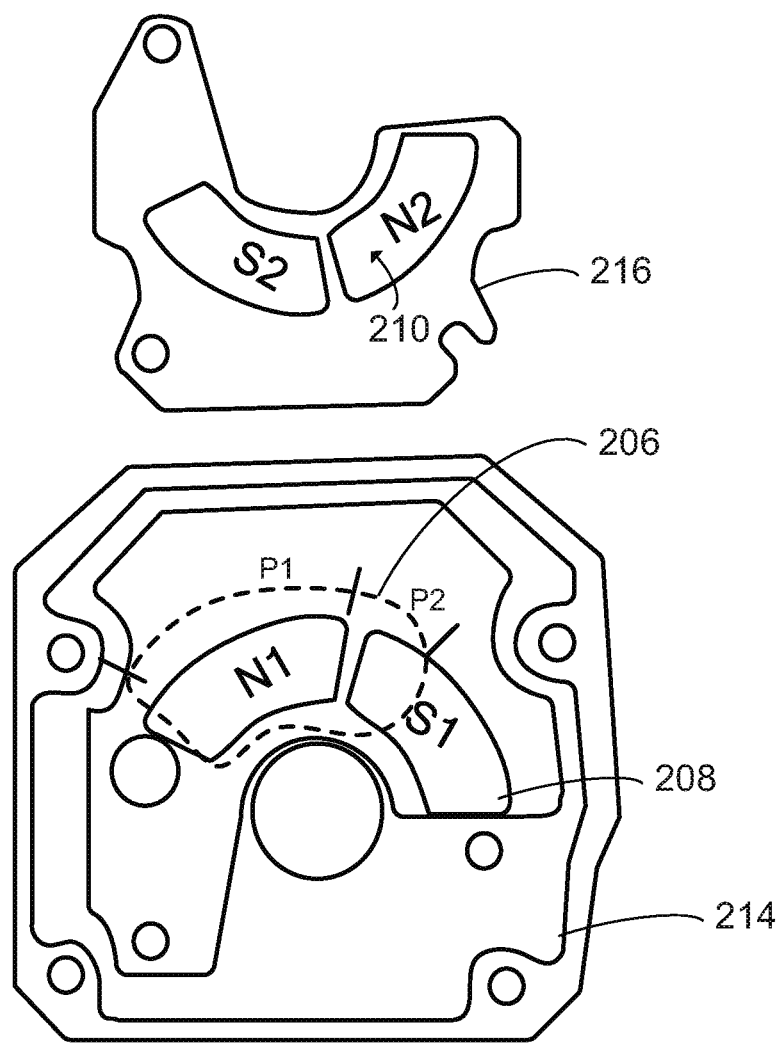
FIG. 4 is a schematic of an example arrangement of the magnet and the magnet.

FIG. 4 is a schematic of an example arrangement of the magnets 208 and 210. When assembled, the orientation of the plate 216 is flipped in the direction of top to bottom so that the south pole S2 of magnet 210 aligns face-to-face with the north pole N1 of magnet 208 to create a magnetic field between the south pole S2 and north pole N1, and the north pole N2 of magnet 210 aligns face-to-face over the south pole S1 of magnet 208 to create a magnetic field between the north pole N2 and the south pole S1, in an opposite direction to the magnetic field created by south pole S2 and north pole N1.

The armature 206 is rotatably positioned between magnet 208 and magnet 210. In a de-energized state a position of the armature 206 is maintained by the return spring 218 so that a major portion P1 of the armature 206 is positioned over north pole N1 and a minor portion P2 of the armature 206 is positioned over the south pole S1. Lorentz force generates the force on the two radial segments P1 and P2 of the coil windings of the armature 206 as current flows. The Lorentz force can include combination of electric and magnetic force on a point charge due to electromagnetic fields. Moving the armature 206 moves the shaft 202 which in turn moves the throttle valve 106, to supply more or less air into the engine 100.

Figure 5:
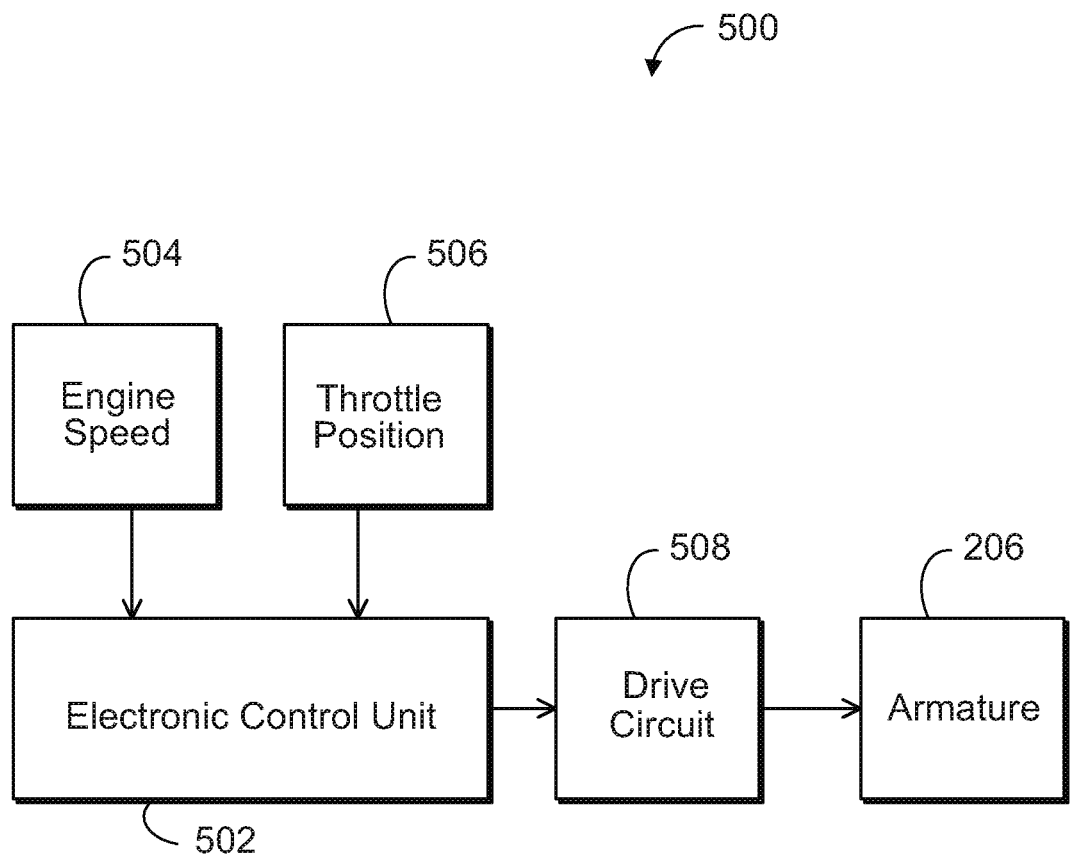
FIG. 5 is a block diagram of an example control system for controlling movement of the valve.

FIG. 5 is a block diagram of an example control system 500 for controlling movement of the valve 106. An electronic control unit 502 receives a signal representing engine requested and actual speed 504 and a signal representing throttle position 506 to control a desired position of the valve 106, e.g., via the armature 206. The electronic control unit 502 can be implemented with one or more control units. The electronic control unit 502 can determine when to send a drive signal to the drive circuit 508 which sends current to the windings of the armature 206 to determine movement of the armature 206. The armature 206 drives the throttle valve 106 to the desired tilt position, e.g., to let more or less air into the engine 100 based on the engine speed 504, throttle position 506, etc. In some examples, the electronic control unit 502 includes a processor and a memory. The memory can store instructions which when executed by the processor perform the functions described herein, e.g., based on the engine speed 504, throttle position 506, etc.

When the air passage 200 is closed by the valve 106, which is placed under the influence of the spring 218, a fixed low amount of air is admitted through the passage 200. The electronic control unit 502 feeds the drive signal to the drive circuit 508 and the drive circuit 508 energizes the coil windings of the armature 206 to produce torque, e.g., in the manner as described above. The magnets 208 and 210 create magnetic fields that cause the armature 206 to rotate the desired amount while overcoming the action of the return spring 218, to cause the throttle valve 106 to turn with the result that the air passage 200 is opened accordingly. When it becomes desired to throttle off the air passage 200, the electronic control circuit 502 sends a signal to de-energize the armature coils. Consequently, the throttle valve 106 is tilted back to its original throttling position by the return spring 218.

In some implementations, a tilt detector may be used, e.g., a potentiometer, tachogenerator, encoder or any other suitable means, which is adapted to produce and transmit a signal to the electronic control circuit 502 representing the degree of tilt of the throttle valve 106 then positioned, or the current opening of the air passage 200.

Figure 6:
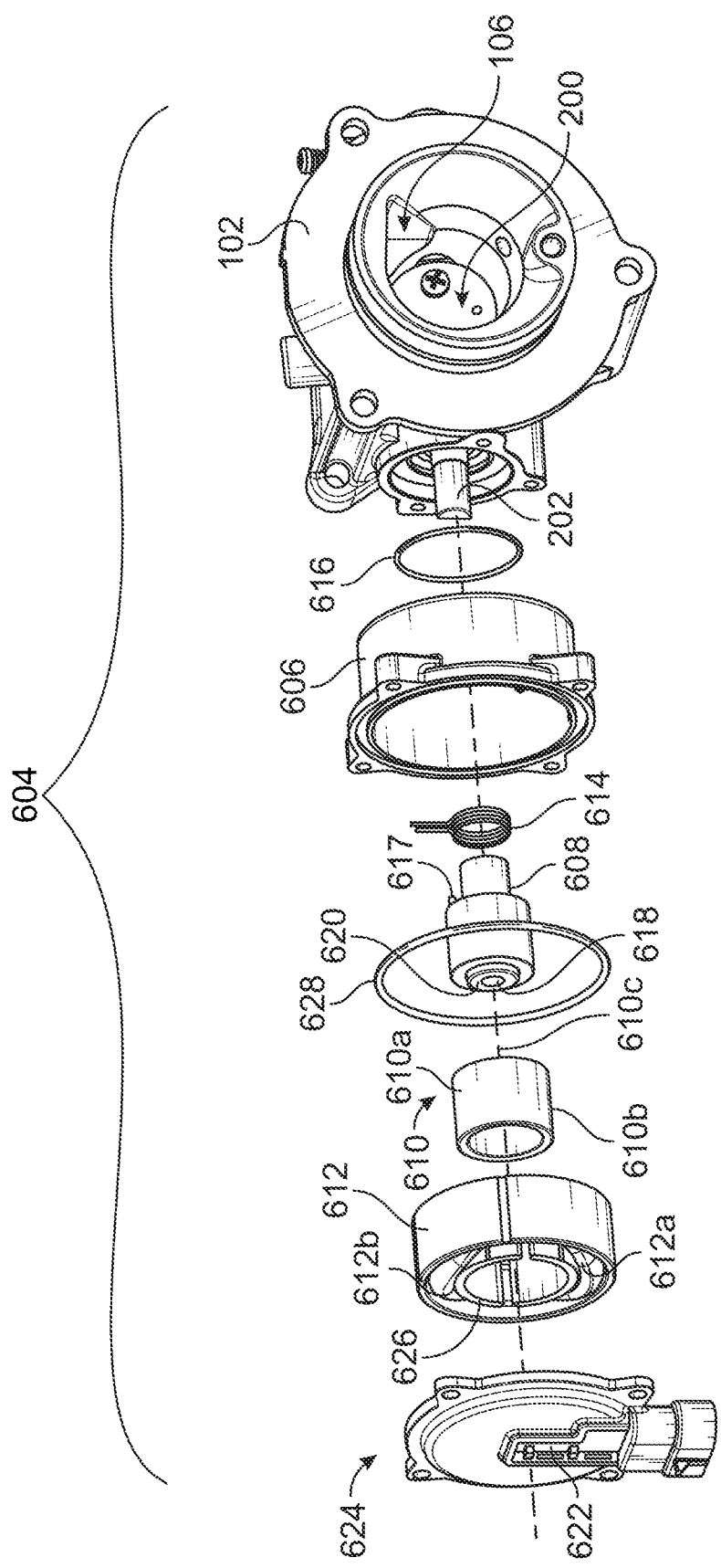
FIG. 6 is an exploded view of an example drive actuator that connects with the throttle body.

FIG. 6 is an exploded view of an example drive actuator 604 that connects with the throttle body 102. In operation, the throttle valve 106 is driven to rotate by the drive actuator 604 by way of the shaft 202. In some examples, the shaft 202 adjusts the tilt of the throttle valve 106 for adjusting the opening of the air passage 200, hence the flow of air passing there through. Other types of throttle valves can be used. A main actuator housing 606 attaches with the throttle body 102 to house a rotor hub 608, a magnet 610, a stator 612 and a return spring 614. In some examples, the main actuator housing is integrated into the throttle body 102. A seal 616 can be positioned between the main actuator housing 606 and throttle valve 106, e.g. to prevent water and/or debris from entering the main actuator housing 606.

The rotor hub 608 can mechanically connect with the shaft 202 to rotate the shaft 202 to open and close the throttle valve 106. The rotor hub 608 can include a pin 617 which engages the spring 614 to return the rotor hub 608 to a neutral position when the drive actuator 604 is not powered, e.g., so that the throttle valve is biased in a determined position, e.g., a closed or slightly open position. Additionally or alternatively, the spring 614 can provide the some or all of the functions of the spring 218 described above. The throttle valve 106 can be closed when the rotor hub 608 is positioned in the neutral position. The magnet 610 e.g., a permanent magnet and/or wire windings with electrical current applied, is assembled to the rotor hub 608, e.g., in some examples bonded with epoxy to the rotor hub 608. In some examples the magnet 610 is integrated with the rotor hub 608. The magnet 610 includes a north pole 610a and a south pole 610b about an axis 610c of the magnet 610. In some examples, the north pole 610a and the south pole 610b can be charged radially about the axis 610c. In some examples, the magnet 610 is cylindrical shaped with a hollow center to fit over the rotor hub 608. Other shapes can be used.

In some example, the rotor hub 608 can also include a throttle position magnet 618 and accompanying carrier 620 connected with the rotor hub 608, in which a magnetic field of the throttle position magnet 618 is sensed by a position sensor 622, e.g., positioned on a cover housing 624 of the drive actuator 604. In some examples, the position sensor 622 is positioned in a cavity of the cover housing 624. In some examples, the position sensor 622 can detect the magnetic field from the magnet 610 to determine position, and not require the throttle position magnet 618 and carrier 620. An O-ring 628, or other sealing mechanism posited between the cover housing 624 and the main actuator housing 606 can prevent water and/or debris from entering the main actuator housing 606. When assembled, a width of the main actuator housing 606 and the cover housing 624 is less than one-third a width of the throttle body. The position sensor 622 can send determined signals to the electronic control unit 502, or other control unit, which represent a current position of the rotor hub 608, e.g., relative to the resting position. The electronic control unit 502 can adjust a position of the rotor hub 608 based on a determined need for more or less air to allow to flow through the throttle body 102 to feed the engine 100.

The stator 612 can include a first pole 612a and a second pole 612b that can be switched to north and south magnetic fields. In some examples the first pole 612a and the second pole 612b are implemented with copper or other types of wire windings. Other materials can be used for the windings. The rotor hub 608 can rotate within a stator pole shoe/saddle 626 of the stator 612. The magnetic field generated by the north pole 610a and the south pole 610b of the magnet 610 interacts with the magnetic fields generated by the stator 612. In some examples, the windings are configured so that a current though the windings cause the first pole 612a to become temporarily magnetized as a north pole and the second pole 612b to become temporarily magnetized as a south pole, or vice versa. A direction of current through the windings can dictate a direction that the rotor hub 608 rotates. The first pole 612a and the second pole 612b can include wire leads to connect with the electronic control unit 502, or other control unit, to control the current sent to the windings. While two poles are described for the magnet 610 and the stator 612, in some examples the magnet 610 and/or the stator 612 include one or more poles.

Figure 7:
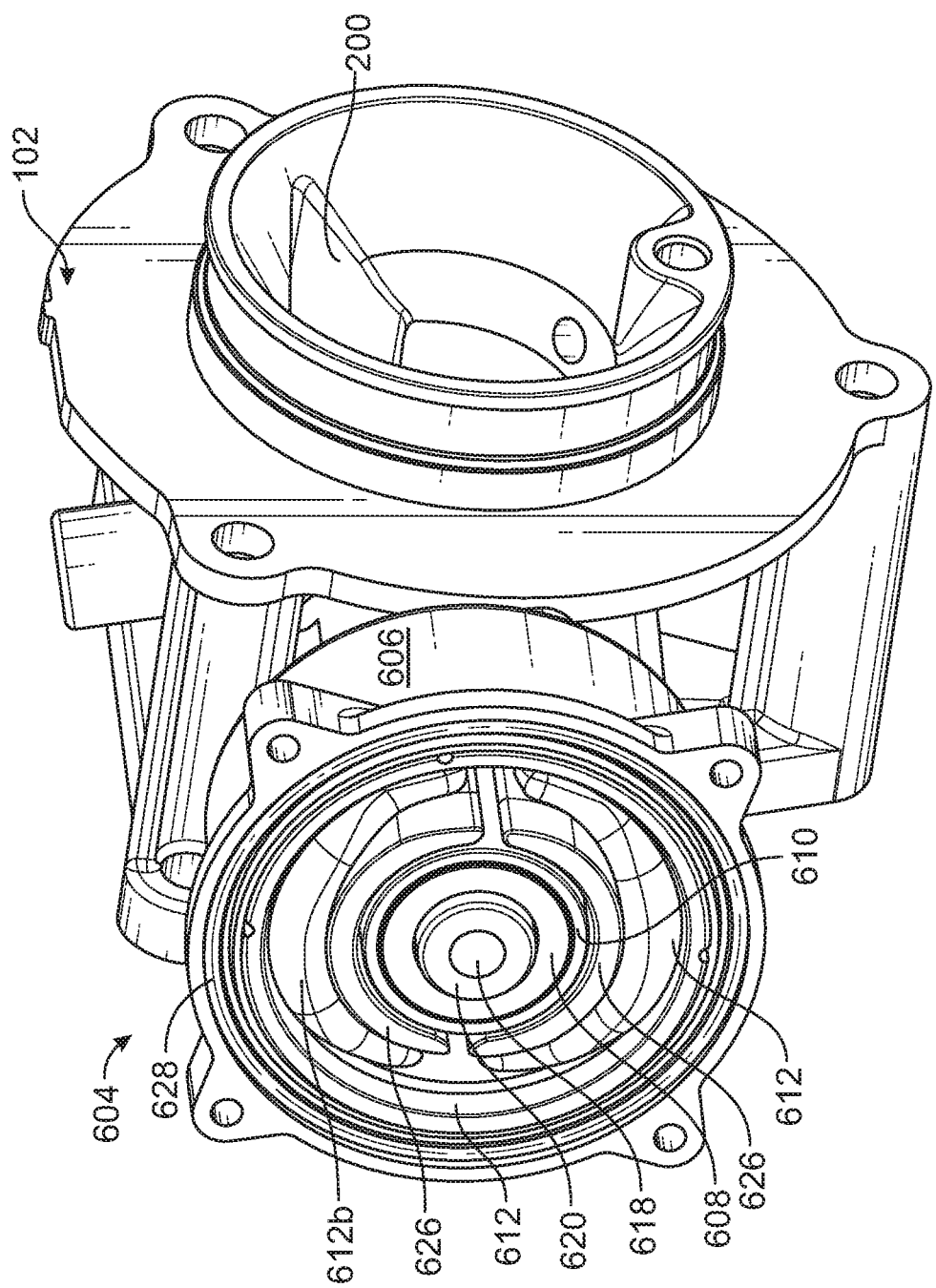
FIG. 7 is a schematic of the drive actuator of FIG. 6 assembled with the throttle body.

FIG. 7 is a schematic of the drive actuator 604 of FIG. 6 assembled with the throttle body 102 of the engine 100. In some examples, the stator 612 is switchably controlled to provide a magnetic field to rotate rotor hub 608 which is mechanically connected with a valve 106 of a throttle body 102, to open a close the air passage 200 of the throttle body 102.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

We claim:

1. A throttle drive actuator for an engine, the throttle drive actuator comprising:
a rotor hub attached to or including a rotor hub magnet;
a throttle body operatively connected to the rotor hub, the throttle body including a rotatable shaft and a throttle valve, such that the rotor hub mechanically connects with the rotatable shaft to cause the throttle valve to open and close an air passage of the throttle body;
a stator including a saddle defined therein, the stator radially disposed and fixed in place around the rotor hub magnet, wherein the rotor hub is positioned radially within and rotatable within the saddle, such that the stator is configured to provide a magnetic field to rotate the rotor hub and cause the throttle valve to open and close the air passage of the throttle body; and
a spring attached directly to the rotor hub and configured to bias the throttle valve in a predetermined position.

2. The throttle drive actuator of claim 1, wherein the rotor hub comprises a pin engaging the spring.

3. The throttle drive actuator of claim 1, further including a throttle position sensor magnet disposed on the rotor hub.

4. The throttle drive actuator of claim 1, further including a main actuator housing and a cover housing removably attached to the main actuator housing, wherein respective widths of the main actuator housing and the cover housing are each less than one-third of a width of the throttle body.

5. The throttle drive actuator of claim 4, further including a seal positioned between the main actuator housing and the throttle valve.

6. The throttle drive actuator of claim 1, further including an electronic control unit configured to control the stator.

7. The throttle drive actuator of claim 6, wherein the electronic control unit is configured to send a signal to the stator based on a received engine speed and throttle position.

8. The throttle drive actuator of claim 1, wherein the rotor hub magnet is a permanent magnet.

9. The throttle drive actuator of claim 1, wherein the stator comprises wire windings configured to provide the magnetic field.

10. The throttle drive actuator of claim 1, wherein the rotor hub magnet is cylindrically shaped with a hollow center.

11. The throttle drive actuator of claim 10, wherein a portion of the rotor hub is positioned in the hollow center of the rotor hub magnet.

12. The throttle drive actuator of claim 2, wherein the spring is radially disposed against the rotor hub.

13. The throttle drive actuator of claim 1, wherein the spring is radially disposed around the rotor hub.

* * * * *